UNITED STATES PATENT OFFICE.

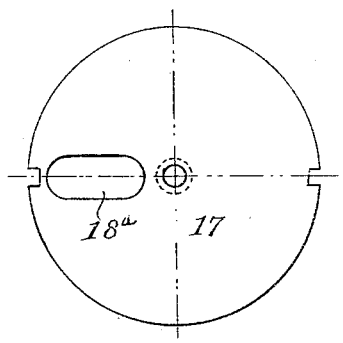
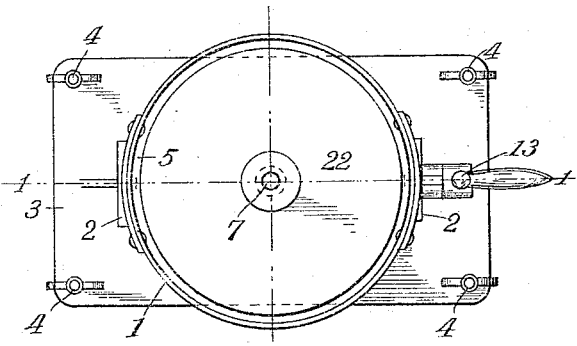
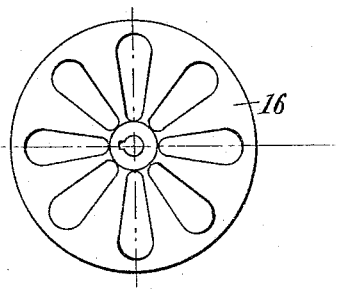
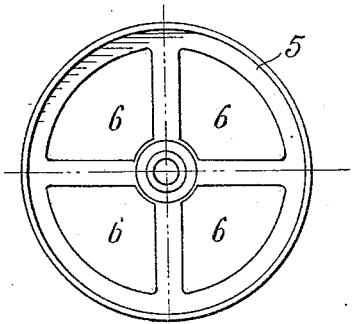
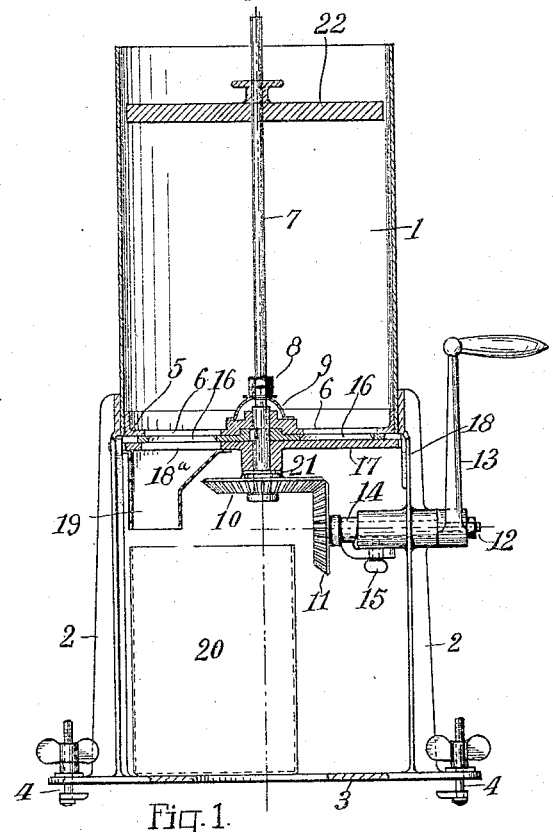

ALBERT G. KOPACKI, OF BAY CITY, MICHIGAN.

VEGETABLE-SLICER.

1,199,389.   Specification of Letters Patent.   Patented Sept. 26, 1916.

Application filed November 10, 1913. Serial No. 800,198.

*To all whom it may concern:*

Be it known that I, ALBERT G. KOPACKI, a citizen of the United States of America, residing at Bay City, in the county of Bay and State of Michigan, have invented certain new and useful Improvements in Vegetable-Slicers; and I do hereby declare the following to be a full, clear, and exact description of the invention, such as will enable others skilled in the art to which it appertains to make and use the same.

My invention relates to improvements in vegetable slicers, and its object is to provide a device adjustable for various thickness of slices; to provide the same with means for readily assembling and disassembling the same, and to provide the device with various new and useful features hereinafter more fully described and particularly pointed out in the claims, reference being had to the accompanying drawings, in which:—

Figure 1 is a vertical section of a device embodying my invention taken on the line 1—1 of Fig. 2; Fig. 2 is a plan view of the same; Fig. 3 is a plan of the bottom of the receptacle; Fig. 4 is a plan of the rotary cutter; and Fig. 5 is a plan of the vertically adjustable disk.

Like numbers refer to like parts in all of the figures.

1 represents a receptacle or hopper for the vegetables to be sliced, supported in an elevated position upon legs 2 mounted on a base 3 provided with clamps 4 to secure the same to any convenient table or support, preferably cylindrical in form and having a skeleton bottom 5 provided with large openings 6 through which the vegetables project into the path of the cutter. In the axis of the device is a vertical shaft 7 provided with jam nuts or a removable collar 8 supporting the same upon a yieldable arch or spring 9 carried by the central portion of the bottom 5. Fixed on the lower end of this shaft is a bevel gear 10 engaged by a bevel pinion 11 mounted on a longitudinally adjustable shaft 12 journaled in one of the legs and manually rotated by a suitable crank 13.

To hold the gears in mesh, a removable yoke 14 embraces the shaft between the hub of the gear 11 and the journal bearing for the shaft, and is detachably secured in place by a thumb screw 15. A rotary cutter 16 is splined to the shaft 7 and provided with a series of openings having cutting edges to slice the vegetables projecting through the openings 6. Close below the cutter and supporting the same in close relation to the bottom 5 is a disk 17 vertically adjustable on ways 18 on the legs 2. This disk is supported on a changeable washer 21 carried on the hub of the gear 10.

The skeleton bottom 5, which is provided with the openings 6 is fixed within the lower end of the vertical receptacle 1 and it is provided with the central boss upon which the arched spring 9 is mounted. The spring 9 in turn supports the collar or nuts 8 which are fixed on the shaft 7 and this provides a vertically yieldable support for the shaft. The cutter 16 which is below the bottom 5 and which is splined to the shaft is permitted a slight vertical movement. Below this cutter and supporting the same is the disk 17 which is vertically movable and carried by the washer 21 resting on the horizontal gear 10 fixed to the lower end of the shaft 7. By this arrangement the spring 9 yieldably carries the shaft together with the disk 17 and the cutter 16. The spring 9 thus exerts a yieldable upward pressure upon the shaft and urges the disk 17 and the cutter 16 toward the bottom 5. The purpose and function of this spring is to retain a close relation of these three members and at the same time any grit or small particles that would otherwise stop or injure the machine are allowed to pass between the fixed bottom 5 and the downwardly yieldable disk 17 through the action of the spring 9. The ways 18 consist of vertical ribs and the disk 17 has opposite notches 17$^a$ to slidably receive the ribs.

An opening 18$^a$ is provided in the disk to permit the escape of the slices as they are carried around over the same by the cutter. A spout 19 directs the slices as they fall into a suitable receptacle 20, removably supported on the bed plate 3. To change the thickness of the slices the cutter 16 is made interchangeable with like cutters and of different thickness to determine the thickness of the slices, and the washers 21 in like manner are interchangeable with other washers of different thickness, and as thicker cutters are inserted thinner washers are used, whereby substantially constant tension on the spring 9 is maintained, and the disk 17 vertically adjusted to conform to the changed thickness of the cutter. To force the vegetables downward a heavy disk 22 may be used having a central opening to receive the shaft.

To disassemble the machine for cleaning or changing the cutters, the weight 22 is first removed then the nuts or collar 8 detached from the shaft and the yoke 14 removed, thus permitting the gear 11 to be moved out of the way of the gear 10, whereupon the shaft may be removed downward from the machine. The disk 17, the cutter 16, and the spring 9 can then be removed and the machine readily cleaned or the cutter changed as desired.

Obviously my invention can be used for slicing other materials than vegetables, such as, for instance slicing meats, shaving ice, and other like uses. I do not limit myself to any particular material to be operated upon, or the precise details of construction shown.

What I claim is:—

1. A cutter of the class described including a vertical receptacle, a skeleton bottom fixed to the lower end of the receptacle, a vertical shaft slidable through the said bottom, a gear fixed to the lower end of the shaft, a vertically movable disk supported by the gear, means for guiding the disk and for holding same against rotary movement, a rotary cutter mounted on and slidably interlocked with the shaft and interposed between the bottom of the receptacle and the disk, yieldable means mounted on the said bottom and connected with the shaft for urging the same upwardly, and means for rotating the said gear.

2. A cutter of the class described including vertical guiding ribs, a vertical receptacle located above the said ribs and provided with a fixed skeleton bottom, a vertical shaft slidable through the said bottom, a disk mounted upon the lower end of the shaft and supported by the same, said disk being provided with opposite notches to receive the said ribs and slidable thereon, a rotary cutter carried by the shaft and slidably interlocked therewith, said cutter being interposed between the bottom of the receptacle and the disk, means mounted on the said bottom for yieldably urging the shaft upwardly, and means for rotating the shaft.

3. A cutter of the class described including vertical guiding ribs, a vertical receptacle located above the said ribs and provided with a fixed skeleton bottom, a vertical shaft slidable through the said bottom, a disk mounted upon the lower end of the shaft and supported by the same, said disk being provided with opposite notches to receive the said ribs and slidable upwardly and downwardly thereon, a rotary cutter carried by the shaft and slidably interlocked therewith, said cutter being interposed between the bottom of the receptacle and the disk, a collar detachably mounted on the shaft above and in spaced relation with the said bottom, an arched spring supported upon the said bottom and engaging the collar to yieldably urge the shaft upwardly, and means for rotating the shaft.

4. A cutter of the class described including a vertically disposed superimposed receptacle having a fixed skeleton bottom, a vertical shaft slidable through the bottom and provided above the same with a removable collar, an arched spring mounted on the said bottom and bearing against the said collar to urge the shaft upwardly, a disk supported by the lower end of the shaft and movable upwardly and downwardly, means for guiding the disk and for holding the same against rotary movement, a rotary cutter slidably interlocked with the shaft and interposed between the disk and the bottom of the receptacle, and means for rotating the shaft.

5. A cutter of the class described including a vertical receptacle having a fixed skeleton bottom, a vertical shaft slidable through the bottom and provided at the lower end with a horizontal gear, a removable washer arranged upon the gear, a vertically movable disk supported by the washer, guiding means for the disk, a removable rotary cutter interlocked with the shaft and interposed between the said bottom and the disk, yieldable means mounted on the bottom for urging the shaft upwardly and a horizontal operating shaft having a vertical gear meshing with the said gear, said horizontal shaft being slidable inwardly and outwardly.

In testimony whereof I affix my signature in presence of two witnesses.

ALBERT G. KOPACKI.

Witnesses:
  FRANK C. SEAMAN,
  IDA L. BEAUDIN.

Copies of this patent may be obtained for five cents each, by addressing the "Commissioner of Patents, Washington, D. C."